US009069173B2

(12) United States Patent
Imai

(10) Patent No.: US 9,069,173 B2
(45) Date of Patent: Jun. 30, 2015

(54) LIGHT SCANNING APPARATUS AND IMAGE FORMING APPARATUS

(71) Applicant: CANON KABUSHIKI KAISHA, Tokyo (JP)

(72) Inventor: Toru Imai, Kyoto (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 404 days.

(21) Appl. No.: 13/685,138

(22) Filed: Nov. 26, 2012

(65) Prior Publication Data

US 2013/0135423 A1 May 30, 2013

(51) Int. Cl.
- *B41J 2/44* (2006.01)
- *B41J 2/47* (2006.01)
- *B41J 29/02* (2006.01)
- *G02B 26/12* (2006.01)
- *G02B 7/00* (2006.01)

(52) U.S. Cl.
CPC .................. *G02B 26/12* (2013.01); *B41J 2/442* (2013.01); *B41J 2/471* (2013.01); *B41J 29/02* (2013.01); *G02B 7/008* (2013.01)

(58) Field of Classification Search
CPC ............. B41J 2/442; B41J 2/471; B41J 29/02
See application file for complete search history.

(56) References Cited

U.S. PATENT DOCUMENTS

2013/0070041 A1*  3/2013  Hudson et al. ................ 347/242

FOREIGN PATENT DOCUMENTS

JP         2008-168622 A       7/2008

* cited by examiner

*Primary Examiner* — Justin Seo
*Assistant Examiner* — Kendrick Liu
(74) *Attorney, Agent, or Firm* — Fitzpatrick, Cella, Harper & Scinto

(57) ABSTRACT

A light scanning apparatus configured to irradiate a surface to be scanned with a light beam, including: a light source configured to emit the light beam; a deflector configured to deflect the light beam to scan the surface; an optical element configured to lead the light beam to the surface; a housing configured to hold the light source, the deflector, and the optical element, and including fibers; and a rib formed integrally with a bottom portion of the housing on which the deflector and the optical element are disposed, the rib standing on the bottom portion between the deflector and the optical element to suppress a deformation of the housing in a scanning direction, wherein the fibers of the rib are oriented along the scanning direction, and the fibers of the bottom portion are oriented along the bottom portion and in a direction perpendicular to the scanning direction.

7 Claims, 11 Drawing Sheets

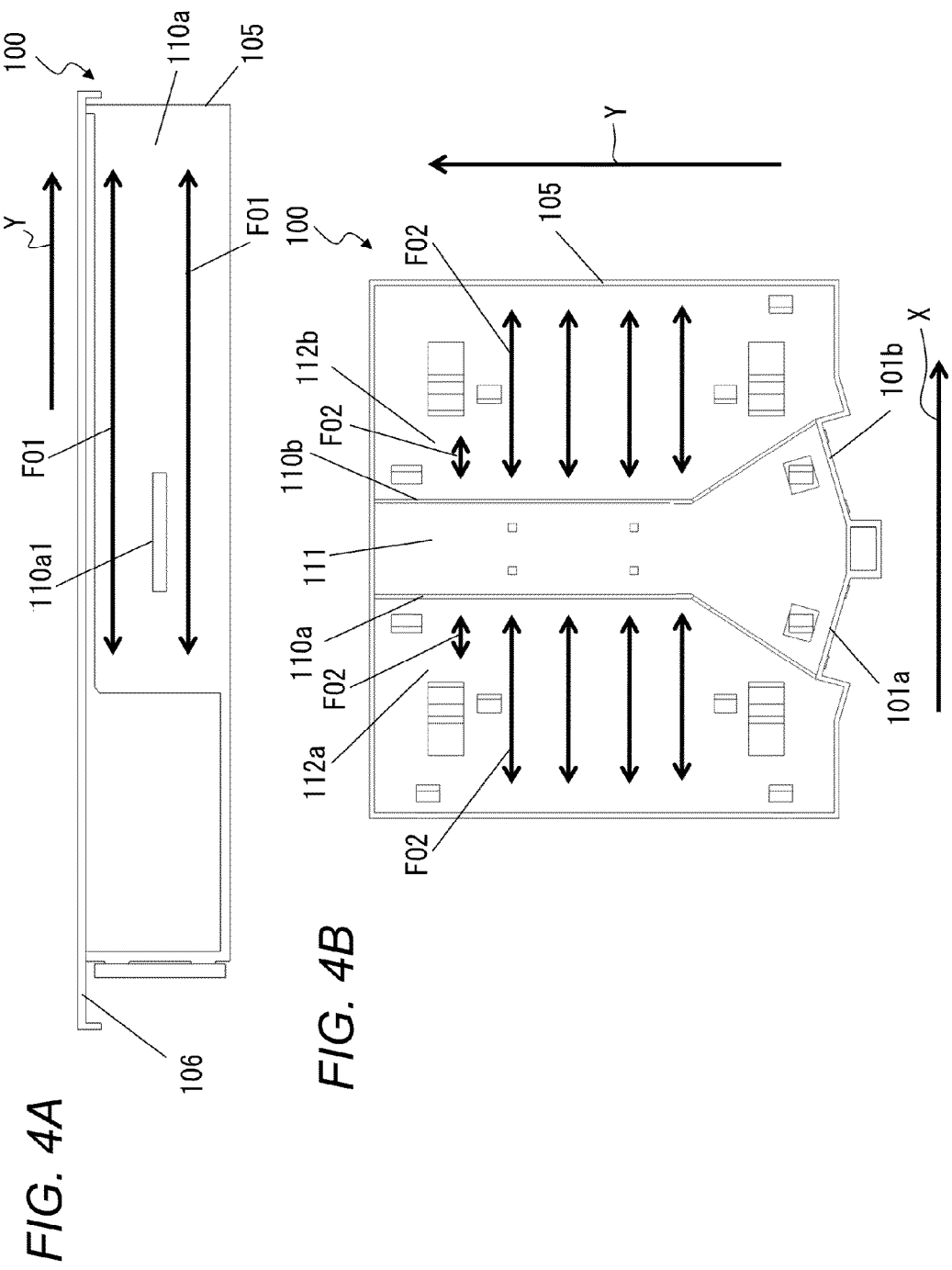

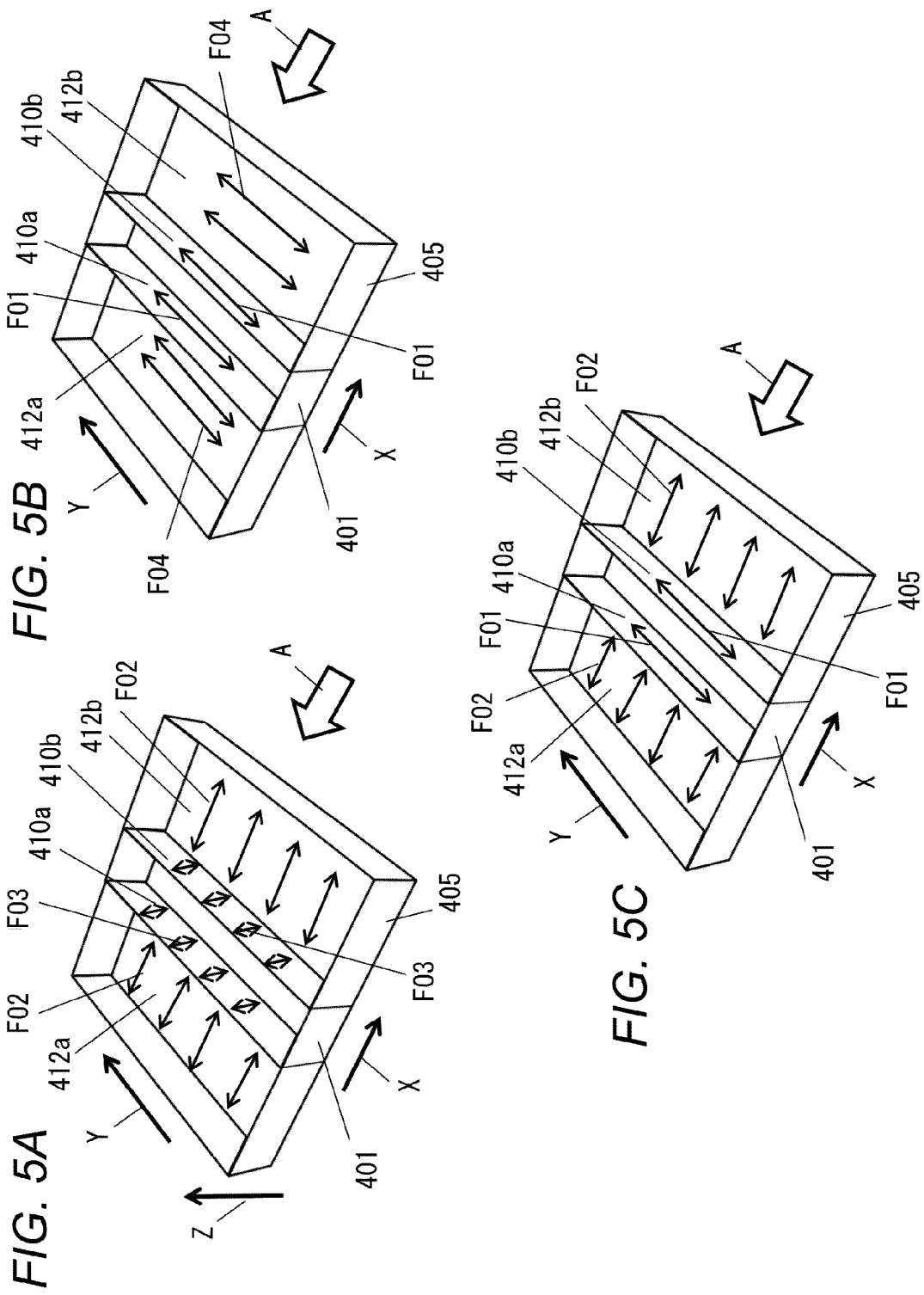

LIGHT SCANNING APPARATUS AND IMAGE FORMING APPARATUS

BACKGROUND OF THE INVENTION

1. Field of the Invention

The present invention relates to a light scanning apparatus molded out of fiber-reinforced resin and an image forming apparatus including the light scanning apparatus.

2. Description of the Related Art

Conventionally, in an electrophotographic image forming apparatus, a light scanning apparatus using a housing molded out of fiber-reinforced resin has been often used.

The light scanning apparatus includes a deflector configured to deflect a light beam emitted from a light source so that the light beam may scan a surface to be scanned. The deflector includes a polygonal reflection member having a plurality of reflection surfaces configured to reflect the light beam, a motor configured to rotate the reflection member, and a drive board provided with an integrated circuit configured to drive the motor. The motor and the integrated circuit generate heat by electric power supplied thereto. A housing deforms by the heat generated from the motor and the integrated circuit. The thermal deformation of the housing changes the positions of a mirror and a lens supported by the housing. Thus, color misregistration may occur in a color image forming apparatus.

A mean coefficient of linear thermal expansion in a direction along a fiber orientation of the fiber-reinforced resin of the housing is smaller than a mean coefficient of linear thermal expansion in a direction not along the fiber orientation. The amount of thermal deformation of the housing therefore depends on the fiber orientation. The fiber orientation of the housing molded out of fiber-reinforced resin depends on a molding method of the housing. That is, the housing has an easy-to-deform direction and a hard-to-deform direction.

Japanese Patent Application Laid-Open No. 2008-168622 discloses a technology of controlling the fiber orientation of a member molded out of fiber-reinforced resin to reduce the amount of thermal deformation in an apparatus other than the light scanning apparatus. It is an object of Japanese Patent Application Laid-Open No. 2008-168622 to prevent a heating member bonded to the member molded out of fiber-reinforced resin from separating or being broken by the difference in the amount of thermal deformation between the member molded out of fiber-reinforced resin and the heating member. In order to achieve the object, in Japanese Patent Application Laid-Open No. 2008-168622, the fiber orientations are uniformly aligned along a direction in which the amount of thermal deformation of the member molded out of fiber-reinforced resin is intended to be suppressed. In this manner, in the direction in which the amount of thermal deformation is to be suppressed, the difference in the mean coefficient of linear thermal expansion between the member molded out of fiber-reinforced resin and the heating member is reduced, thereby reducing the difference in the amount of thermal deformation.

In the light scanning apparatus, the housing is provided with a rib configured to ensure the rigidity of the housing. Heat generated from a heat generating source produces a temperature difference between a bottom member of the housing and the rib molded out of fiber-reinforced resin integrally with the bottom member of the housing. The temperature difference may be responsible for distortion of the housing.

In addition, simply aligning the fiber orientations of the rib and the bottom member in one direction may result in an increase in the amount of thermal deformation of the housing.

SUMMARY OF THE INVENTION

The present invention provides a light scanning apparatus configured to reduce a distortion of a housing caused by a temperature difference between a rib and a bottom member of the housing.

In order to solve the above-mentioned problem, a light scanning apparatus configured to irradiate a surface to be scanned with a light beam, the light scanning apparatus including: a light source configured to emit the light beam; a deflector configured to deflect the light beam emitted from the light source so that the light beam scans the surface to be scanned; an optical element configured to lead the light beam deflected by the deflector to the surface to be scanned; a housing configured to hold the light source, the deflector, and the optical element, the housing including fibers; and a rib formed integrally with a bottom portion of the housing on which the deflector and the optical element are disposed, the rib being provided to stand on the bottom portion between the deflector and the optical element in order to suppress deformation of the housing in a scanning direction in which the light beam scans the surface to be scanned, wherein the fibers of the rib are oriented along the scanning direction, and the fibers of the bottom portion are oriented along the bottom portion and in a direction perpendicular to the scanning direction.

Further features of the present invention will become apparent from the following description of exemplary embodiments with reference to the attached drawings.

BRIEF DESCRIPTION OF THE DRAWINGS

FIGS. 4A and 4B are diagrams illustrating fiber orientations in a housing of the light scanning apparatus according to the embodiment.

FIGS. 5A, 5B, and 5C are perspective diagrams of a simple housing model illustrating fiber orientations.

DESCRIPTION OF THE EMBODIMENTS

Referring to the accompanying drawings, a light scanning apparatus 100 according to an embodiment of the present invention will be described below.

Figure 1A:
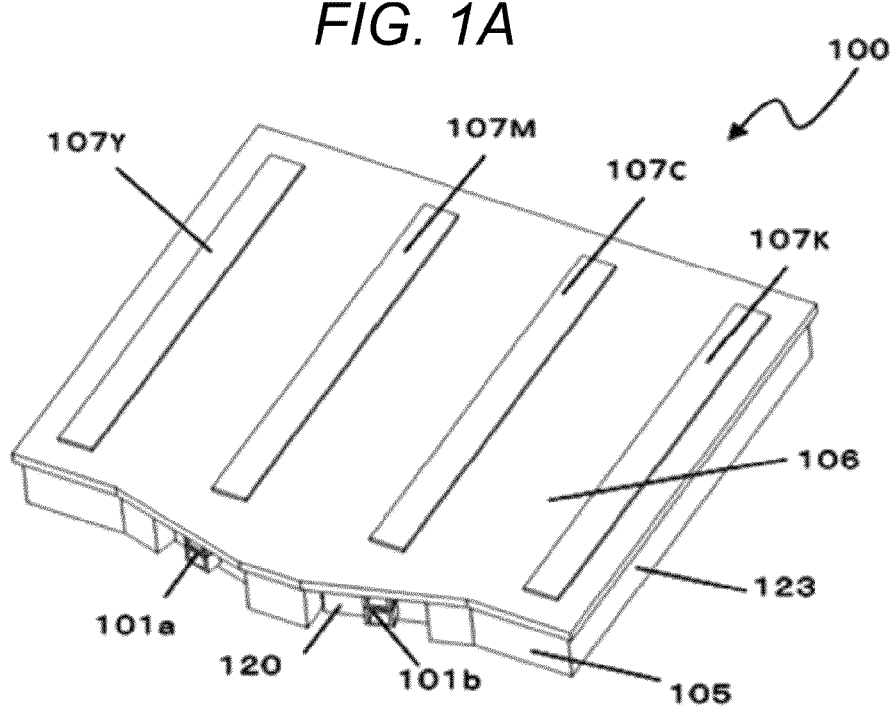
FIGS. 1A, 1B, 1C, and 1D are diagrams illustrating a light scanning apparatus according to an embodiment of the present invention.
Figure 1B:
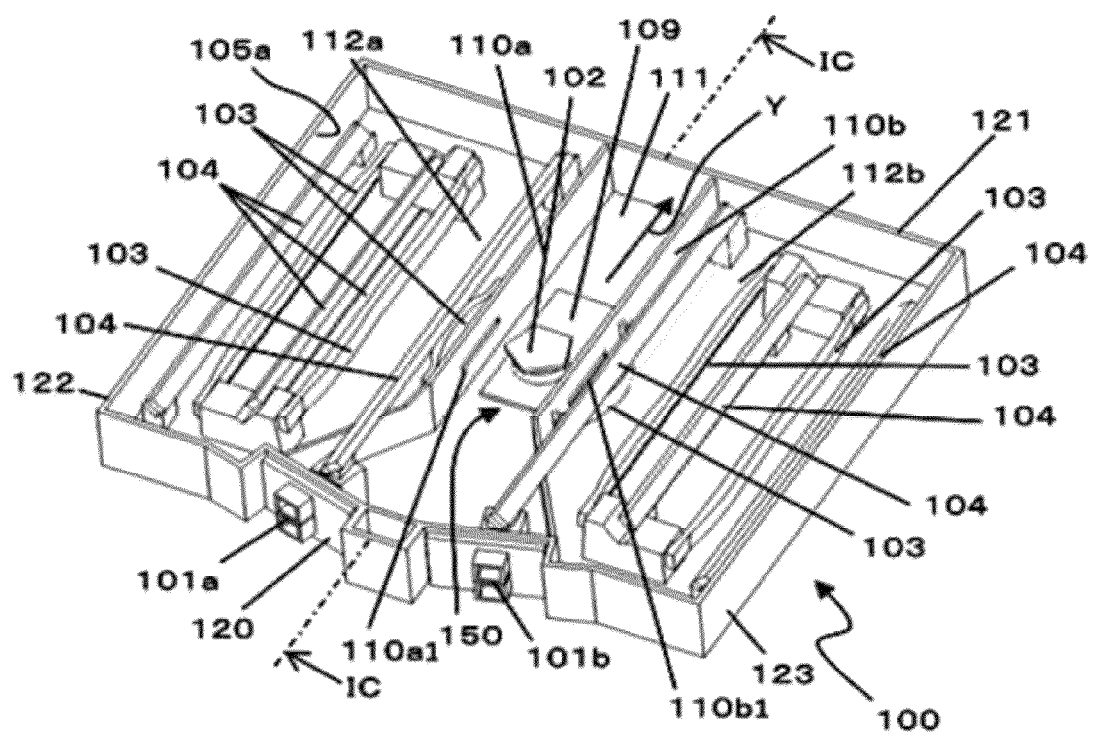
Figure 1C:
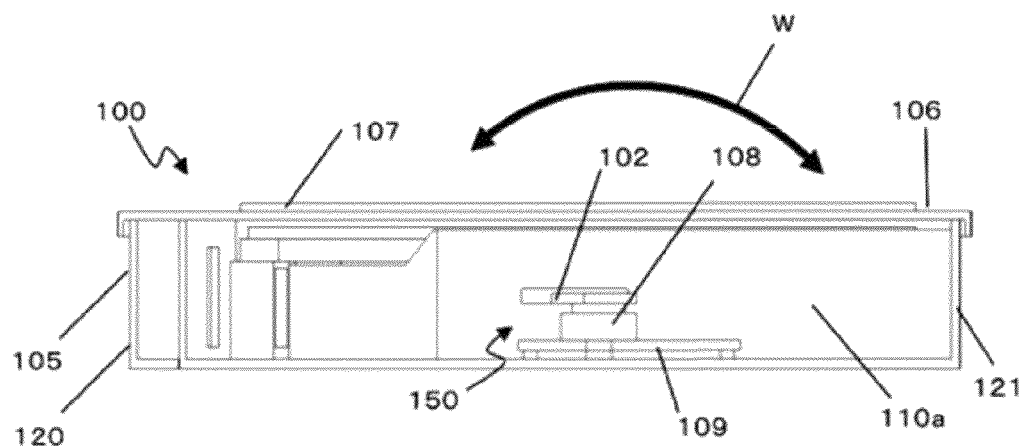
Figure 1D:
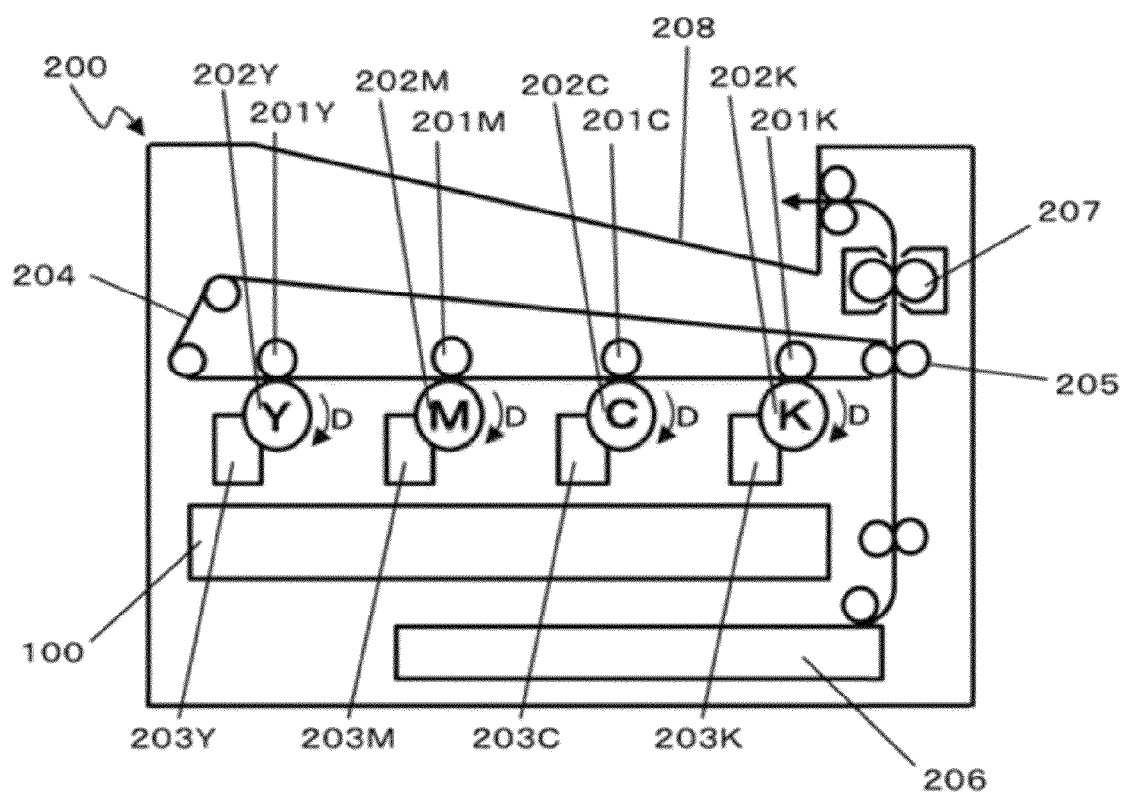

FIGS. 1A, 1B, 1C, and 1D are diagrams illustrating the light scanning apparatus 100 according to the embodiment of the present invention. FIG. 1A is a diagram illustrating the light scanning apparatus 100 on which an upper cover 106 is mounted. FIG. 1B is a diagram illustrating the light scanning apparatus 100 from which the upper cover 106 is removed for purposes of illustration of the inside of the light scanning apparatus 100. FIG. 1C is a vertical cross-sectional diagram of the light scanning apparatus 100 taken along the line IC-IC of FIG. 1B. FIG. 1D is a diagram illustrating the light scanning apparatus 100 mounted in a color image forming apparatus 200.

The light scanning apparatus 100 irradiates the surface (surface to be scanned) of a photosensitive drum (irradiation target) 202 (202Y, 202M, 202C, 202K) mounted in the image forming apparatus 200 with a light beam (laser light). The light scanning apparatus 100 includes a light source 101 (101a, 101b) configured to emit a light beam modulated according to image information, and a deflector 150 configured to deflect the light beam emitted from the light source 101.

The light source 101a includes a light source configured to form an image of yellow (Y) and a light source configured to form an image of magenta (M). The light source 101b includes a light source configured to form an image of cyan (C) and a light source configured to form an image of black (K).

The deflector 150 includes a polygonal reflection member (hereinafter referred to as polygon mirror) 102 having a plurality of reflection surfaces configured to reflect the light beam, and a motor 108 configured to rotate the polygon mirror 102. The deflector 150 may include a drive board 109 provided with an integrated circuit (IC) configured to drive the motor 108. The deflector 150 deflects the light beam emitted from the light source 101 so that the light beam may scan the surface of the photosensitive drum (photosensitive member) 202.

The light scanning apparatus 100 includes optical elements configured to lead the light beam deflected by the deflector 150 to the surface of the photosensitive drum 202. The optical elements include a plurality of lenses 103 configured to image the light beam as a spot onto the surface of the photosensitive drum 202 to scan the light beam at a constant speed, and a plurality of mirrors 104 configured to reflect the light beam to a predetermined direction. The optical elements constitute an imaging optical system configured to image the light beam onto the surface of the photosensitive drum 202.

Figure 2:
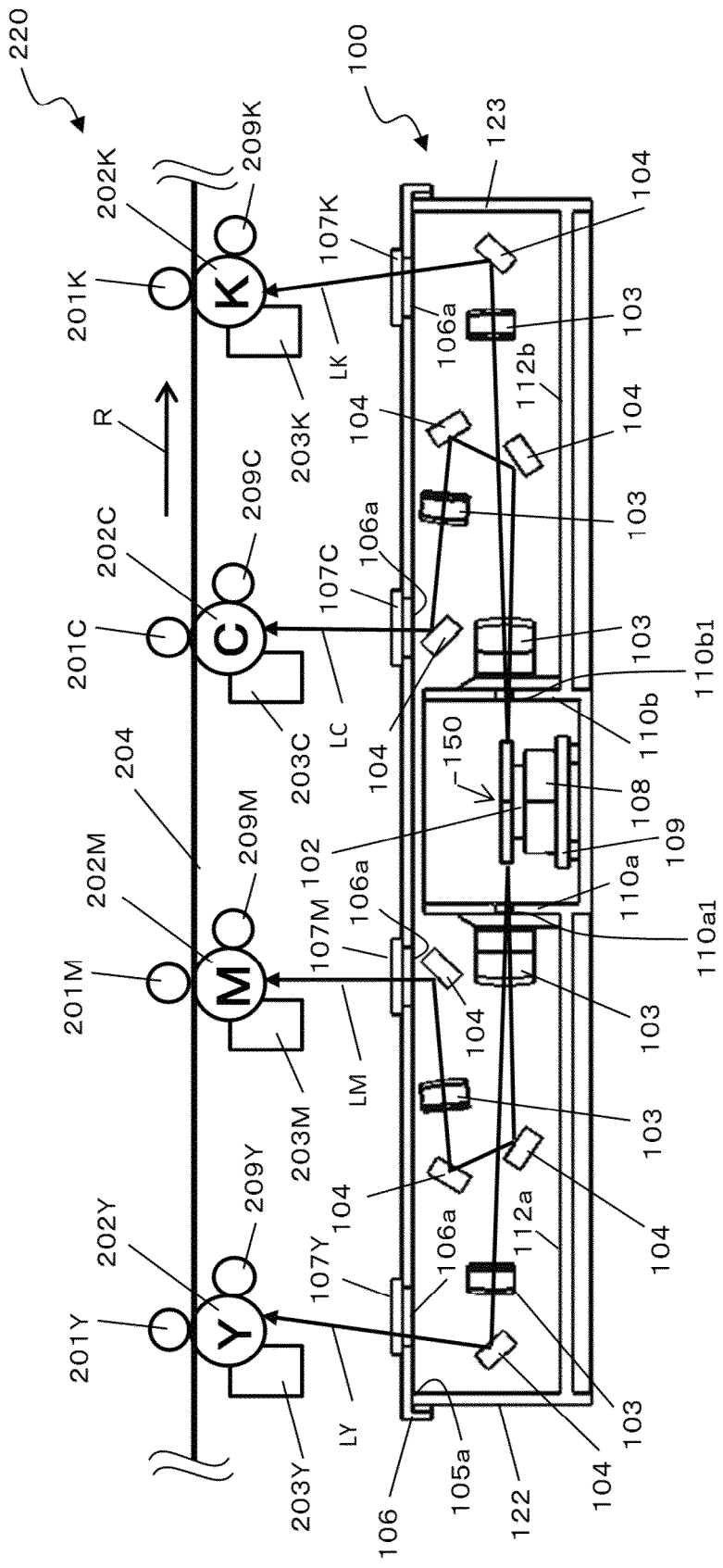
FIG. 2 is a cross-sectional diagram of the light scanning apparatus according to the embodiment.

The lens 103 may be an fθ lens having the function of scanning the light beam on the surface of the photosensitive drum 202 at the constant speed. In the embodiment, the lenses 103 are disposed as illustrated in FIG. 2, but the number of the lenses 103 is not limited thereto.

The mirrors 104 are disposed on an optical path of the light beam so that the light beam deflected and scanned by the deflector 150 is led to the surface of the photosensitive drum 202. In the embodiment, the mirrors 104 are disposed as illustrated in FIG. 2, but the number of the mirrors 104 is not limited thereto.

A housing (optical box) 105 includes bottom members (bottom portions) 111, 112a, and 112b, a front wall member 120, a rear wall member 121, and side wall members 122 and 123, and is formed into a box shape. However, in the present invention, the box shape is not essential, and the housing 105 is not limited to the box shape.

The housing 105 holds the light source 101, the deflector 150, and the optical elements. The light source 101 is fixed to the front wall member 120 of the housing 105. The deflector 150 is supported by the bottom member 111 of the housing 105. The lenses 103 and the mirrors 104 are positioned and fixed to respective mounting portions in the housing 105.

The light scanning apparatus 100 uses a system of scanning the respective light beams in opposite directions with respect to the polygon mirror 102. In order to realize downsizing of the light scanning apparatus 100, the light beam is reflected by the mirrors 104 a plurality of times in the light scanning apparatus 100. Accordingly, the number of the optical elements disposed in the light scanning apparatus 100 is large, and hence the rigidity of the housing 105 is somewhat insufficient. In view of this, in order to enhance the rigidity of the housing 105, ribs 110 (110a, 110b) having the heights extending from the bottom members 112a and 112b of the housing 105 to the upper cover (ceiling) 106, respectively, are molded integrally with the housing 105.

Figure 3:
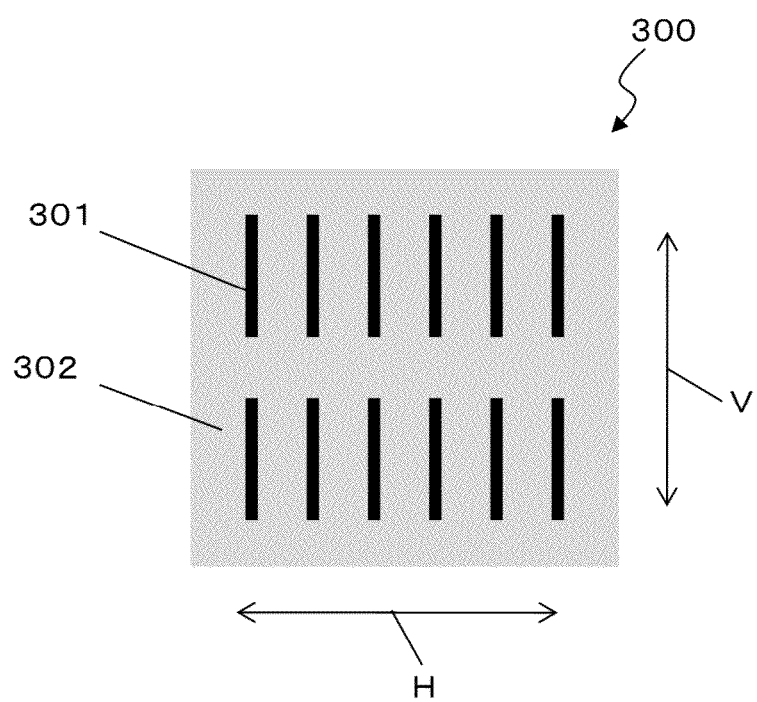
FIG. 3 is a diagram illustrating fiber orientations in a fiber-reinforced resin.

The housing 105 and the ribs 110 are molded out of fiber-reinforced resin 300 including reinforcement fibers 301 (FIG. 3).

However, there is a limit to where the raised ribs 110 having the heights can be disposed, because it is necessary to ensure the optical path of the light beam deflected by the polygon mirror 102. In general, the polygon mirror 102 is provided at the center of the light scanning apparatus 100. Accordingly, in order to enhance the rigidity of the housing 105 effectively, it is preferred to provide the ribs 110 with interposing the polygon mirror 102 between the ribs 110. In the light scanning apparatus 100 of the embodiment, the ribs 110 configured to ensure the rigidity of the light scanning apparatus 100 are provided in regions excluding a deflection scanning region with interposing the deflector 150 having the polygon mirror 102 between the ribs 110.

The ribs 110 suppress the deformation of the housing 105 in a scanning direction (a longitudinal direction Y of the ribs 110) in which the light beam scans the surface of the photosensitive drum 202. Each of the ribs 110 is provided between the deflector 150 and the optical elements and stands on the bottom member (111, 112a, 112b) on which the deflector 150 and the optical elements are disposed.

As illustrated in FIG. 2, the two ribs 110 (110a, 110b) are provided in the housing 105 on both sides of the deflector 150 with interposing the deflector 150 therebetween. The ribs 110a and 110b are provided with opening portions 110a1 and 110b1, respectively. Light beams L (LY, LM) for images of yellow and magenta pass through the opening portion 110a1 of the rib 110a to travel toward the lenses 103. Light beams L (LC, LK) for images of cyan and black pass through the opening portion 110b1 of the rib 110b to travel toward the lenses 103.

The two ribs 110 are molded out of fiber-reinforced resin integrally with the bottom members 111, 112a, and 112b of the housing 105 which support the deflector 150 and the optical elements. The rib 110a is provided between the bottom member 111 on which the deflector 150 is provided and the bottom member 112a which is on a side opposite to the deflector 150 with respect to the rib 110a. The rib 110b is provided between the bottom member 111 on which the deflector 150 is provided and the bottom member 112b which is on a side opposite to the deflector 150 with respect to the rib 110b. That is, the two ribs 110a and 110b are disposed opposite to each other with interposing the deflector 150 between the ribs 110a and 110b. The two ribs 110a and 110b are provided in order to enhance the rigidity of the housing 105. Further, the two ribs 110a and 110b are provided in a state in which the deflector 150 is interposed between the ribs 110a and 110b in order to prevent flare.

The bottom member 112a on the side opposite to the deflector 150 with respect to the rib 110a supports the optical elements (lenses 103 and mirrors 104) configured to irradiate the photosensitive drum 202Y for forming a yellow image and the photosensitive drum 202M for forming a magenta image with light beams. The bottom member 112b on the side opposite to the deflector 150 with respect to the rib 110b supports the optical elements (lenses 103 and mirrors 104) configured to irradiate the photosensitive drum 202C for forming a cyan image and the photosensitive drum 202K for forming a black image with light beams. The bottom members 111, 112a, and 112b are support members configured to support the deflector 150 or the optical elements (lenses 103 and mirrors 104). Depending on the orientation of the light scanning apparatus 100 mounted in the image forming apparatus 200, the bottom members 111, 112a, and 112b constitute the lower portion or the upper portion of the light scanning apparatus 100, or are disposed along the vertical direction.

The rib 110a prevents so-called flare in which a reflected light from an incident surface or an exit surface of the lens 103 supported by the bottom member 112a returns toward the deflector 150 to enter the lens 103 supported by the bottom member 112b on the opposite side.

Similarly, the rib 110b prevents so-called flare in which a reflected light from an incident surface or an exit surface of the lens 103 supported by the bottom member 112b returns toward the deflector 150 to enter the lens 103 supported by the bottom member 112a on the opposite side.

The upper cover 106 is mounted on the upper portion of the housing 105. An opening portion 105a provided in the upper portion of the housing 105 is covered by the upper cover 106. The upper cover 106 shields the inside of the housing 105 from external light and prevents a foreign matter from entering the inside of the housing 105. The upper cover 106 is provided with holes 106a through which the light beams pass to the outside of the light scanning apparatus 100. In order to prevent a foreign matter from entering the holes 106a into the inside of the light scanning apparatus 100, each of the holes 106a is covered by a dust-proof glass plate 107 (107Y, 107M, 107C, 107K).

The light scanning apparatus 100 is mounted in the image forming apparatus 200 while supporting the light source 101, the deflector 150, and the optical elements 103 and 104. In this manner, the light source 101, the deflector 150, and the optical elements 103 and 104 are positioned with respect to the photosensitive drum 202 of the image forming apparatus 200.

Referring to FIGS. 1D and 2, an image forming process in the image forming apparatus 200 provided with the light scanning apparatus 100 will be described below.

FIG. 2 is a cross-sectional diagram of the light scanning apparatus 100 according to the embodiment. FIG. 2 illustrates the relationship between the light scanning apparatus 100 and an image forming portion 220 of the image forming apparatus 200.

The image forming portion 220 is disposed above the light scanning apparatus 100. In the image forming portion 220, four photosensitive drums 202 (202Y, 202M, 202C, 202K) are arranged side-by-side in line. A charging roller 209, a developing device 203 (203Y, 203M, 203C, 203K), and a primary transfer roller 201 are disposed around each photosensitive drum 202. The photosensitive drum 202 is rotated in a direction indicated by the arrow D of FIG. 1D. An intermediate transfer belt 204 is disposed between the photosensitive drum 202 and the primary transfer roller 201 and rotates in a direction indicated by the arrow R.

The charging rollers 209 (209Y, 209M, 209C, 209K) uniformly charge the respective surfaces of the photosensitive drums 202 (202Y, 202M, 202C, 202K).

The light scanning apparatus 100 provided in the image forming apparatus 200 according to the embodiment irradiates the lower surfaces of the photosensitive drums 202 with the light beams L (LY, LM, LC, LK), respectively. The light scanning apparatus 100 scans the surface of the photosensitive drum 202, which has been uniformly charged by the charging roller 209, with the light beam L modulated according to image information, to form an electrostatic latent image on the surface of the photosensitive drum 202.

The developing device 203Y develops an electrostatic latent image on the photosensitive drum 202Y with a developer (yellow toner) to form a yellow toner image on the photosensitive drum 202Y. The developing device 203M develops an electrostatic latent image on the photosensitive drum 202M with a developer (magenta toner) to form a magenta toner image on the photosensitive drum 202M. The developing device 203C develops an electrostatic latent image on the photosensitive drum 202C with a developer (cyan toner) to form a cyan toner image on the photosensitive drum 202C. The developing device 203K develops an electrostatic latent image on the photosensitive drum 202K with a developer (black toner) to form a black toner image on the photosensitive drum 202K.

The toner images of the respective colors are transferred and superimposed onto the intermediate transfer belt 204 by the primary transfer rollers 201 (201Y, 201M, 201C, 201K). The toner images superimposed on the intermediate transfer belt 204 are collectively transferred by a secondary transfer roller 205 onto a recording material fed from a recording material containing portion 206 provided in the lower portion of the image forming apparatus 200. The recording material on which the toner images are transferred is conveyed to a fixing device 207. The fixing device 207 applies heat and pressure to the recording material and the toner images so that the toners are fused and mixed so that a full color image is fixed on the surface of the recording material. After passing through the fixing device 207, the recording material is delivered to a delivery portion 208. In this way, the color image formation is completed.

Next, in comparison with the housing of the present invention, a thermal deformation of a housing of which a fiber orientation is not regulated will be described. The housing for comparison has the same outer shape as the housing 105 in the embodiment, and hence the reference symbols illustrated in FIGS. 1A to 1C and FIG. 2 are used to hereinafter describe the thermal deformation of the housing of which the fiber orientation is not regulated.

Each of the motor 108 and the integrated circuit on the drive board 109 mounted in the light scanning apparatus 100 generates heat by electric power supplied thereto. The motor 108 and the integrated circuit on the drive board 109 are main heat generating sources in the light scanning apparatus 100. Heat generated from the motor 108 and the integrated circuit of the drive board 109 is transferred to the housing 105. The heat transferred to the housing 105 increases the temperature of the housing 105 to thermally deform the housing 105. Due to the deformation of the housing 105, the light source 101 fixed to the housing 105 is tilted. A light beam L emitted from the tilted light source 101 scans the surface of the photosensitive drum 202 at a position deviated from a predetermined scanning position. In a color image forming apparatus configured to form an image by scanning of light beams LY, LM, LC, and LK of yellow, magenta, cyan, and black, the deviation of the scanning position has been the main cause of color misregistration, which is misregistration of superimposed images of the respective colors.

Next, how the housing 105 thermally deforms and the main cause of the thermal deformation will be described in detail.

The ribs 110a and 110b are adjacent to the motor 108 and the integrated circuit of the drive board 109, which are the main heat generating sources in the light scanning apparatus 100. Due to an air heated by the heat generating sources, a heat transfer from the heat generating sources via the housing 105 to the ribs 110a and 110b, and a radiation from the heat generating sources, the temperature of the ribs 110a and 110b rises. On the other hand, the bottom member 112a on which the optical elements 103 and 104 are disposed on the side opposite to the motor 108 with respect to the rib 110a and the bottom member 112b on which the optical elements 103 and 104 are disposed on the side opposite to the motor 108 with respect to the rib 110b have a lower temperature as compared to the temperature of the ribs 110a and 110b. Therefore, the amount of thermal expansion of the bottom members 112a and 112b is smaller than the amount of thermal expansion of the ribs 110a and 110b. Thus, thermal expansion at the lower portions of the ribs 110a and 110b connected respectively to the bottom members 112a and 112b is inhibited by the bottom members 112a and 112b. However, a binding force exerted on the upper portions of the ribs 110a and 110b is small, and hence the amount of thermal expansion differs between the upper portions and the lower portions of the ribs 110a and 110b. Due to the difference in the amount of the thermal expansion, the rib 110 undergoes a upwardly protruding convex curvature deformation as indicated by the arrow W in FIG. 1C.

In this case, the upper cover 106 for the dustproof is not firmly connected to the housing 105 in view of ease of assembly. Accordingly, the binding force exerted on the upper portion of the rib 110 by the upper cover 106 is small.

The longitudinal direction of the rib 110 is indicated by the arrow Y in FIG. 1B. Along with the curvature deformation of the rib 110, the front wall member 120 of the housing 105 is tilted, the front wall member 120 to which the light source 101 is fixed being provided on a line extending in the longitudinal direction Y of the rib 110. As a result, the scanning position of the light beam L deviates.

The curvature deformation of the rib 110 is mainly caused by the difference in the amount of the thermal expansion between the rib 110 and the bottom member 112 connected to the rib 110.

In order to reduce the difference in the amount of the thermal expansion between the rib 110 and the bottom member 112 of the housing 105, in the embodiment, the fiber orientations of the rib 110 and the bottom member 112 of the housing 105 are regulated.

Next, the fiber orientation in the fiber-reinforced resin for molding the housing 105 will be described.

FIG. 3 is a diagram illustrating the fiber orientation in the fiber-reinforced resin 300. The fiber-reinforced resin 300 has a fiber orientation depending on a molding method. The mean coefficient of linear thermal expansion of the fiber-reinforced resin 300 depends on the fiber orientation. In other words, the mean coefficient of linear thermal expansion of the fiber-reinforced resin 300 differs in accordance with the direction with respect to the fiber orientation.

A resin 302 of the fiber-reinforced resin 300 includes the reinforcement fibers 301. The mean coefficient of linear thermal expansion of the reinforcement fibers 301 is smaller than the mean coefficient of linear thermal expansion of the resin 302. Accordingly, the mean coefficient of linear thermal expansion in a direction indicated by the arrow V along the fiber orientation of the reinforcement fibers 301 is smaller than the mean coefficient of linear thermal expansion in a direction indicated by the arrow H perpendicular to the direction indicated by the arrow V. The ratio of the mean coefficient of linear thermal expansion in the direction indicated by the arrow H to the mean coefficient of linear thermal expansion in the direction indicated by the arrow V is about 1.4 to 5 times.

In the embodiment, utilizing the fact that the mean coefficient of linear thermal expansion of the fiber-reinforced resin 300 differs depending on the direction with respect to the fiber orientation of the reinforcement fibers 301, the curvature of the rib 110 caused by thermal deformation is suppressed. According to the embodiment, the thermal deformation of the housing 105 can be suppressed simply by changing the molding method without changing the structure of the light scanning apparatus 100.

As described above, the main cause of curvature deformation of the rib 110 is a large difference between the amount of thermal expansion of the rib 110 of a higher temperature and the amount of thermal expansion of the bottom member 112 of a lower temperature. In view of this, by regulating the fiber orientations of the rib 110 and the bottom member 112, the difference between the amount of thermal expansion of the rib 110 of the higher temperature and the amount of thermal expansion of the bottom member 112 of the lower temperature is reduced, thereby reducing the curvature deformation of the rib 110.

FIGS. 4A and 4B are diagrams illustrating fiber orientations FO1 and FO2 of the housing 105 of the light scanning apparatus 100 according to the embodiment. FIG. 4A is a vertical cross-sectional diagram of the light scanning apparatus 100 illustrating the rib 110a. FIG. 4B is a horizontal cross-sectional view of the light scanning apparatus 100 illustrating the bottom members 111 and 112.

The arrow FO1 of FIG. 4A represents the fiber orientation of reinforcement fibers included in a fiber-reinforced resin out of which the rib 110a (110b) is molded. The arrow FO2 of FIG. 4B represents the fiber orientation of reinforcement fibers included in a fiber-reinforced resin out of which the bottom members 112a and 112b are molded.

As illustrated in FIG. 4A, the fiber orientation FO1 of the rib 110 is aligned along the longitudinal direction (laser scanning direction of the light scanning apparatus 100) Y of the rib 110. As illustrated in FIG. 4B, the fiber orientation FO2 of the bottom member 112 is aligned along the direction X perpendicular to the longitudinal direction Y (fiber orientation FO1) of the rib 110. The fiber orientation FO1 of the rib 110 is perpendicular to the fiber orientation FO2 of the bottom member 112. By regulating the fiber orientations of the rib 110 and the bottom member 112 in this way, the mean coefficient of linear thermal expansion of the rib 110 in the direction along the longitudinal direction Y becomes smaller than the mean coefficient of linear thermal expansion of the bottom member 112 in the direction along the longitudinal direction Y. In other words, the fiber orientation FO1 of the rib 110 and the fiber orientation FO2 of the bottom member 112 are regulated to be different from each other so that the mean coefficient of linear thermal expansion of the rib 110 in the direction along the longitudinal direction Y may become smaller than the mean coefficient of linear thermal expansion of the bottom member 112 in the direction along the longitudinal direction Y.

The ribs 110 are disposed adjacent to the motor 108 and the integrated circuit of the drive board 109, which are the main heat generating sources in the light scanning apparatus 100. Therefore, the temperature of the ribs 110 is higher than the temperature of the bottom members 112 provided on the side opposite to the heat generating sources with respect to the ribs 110. However, because of the fiber orientation FO1 of the ribs 110, the amount of thermal expansion of the ribs 110 of the higher temperature in the longitudinal direction Y is reduced to be smaller than the amount of thermal expansion in the longitudinal direction Y of the ribs 110 of which a fiber orientation is not regulated. Further, because of the fiber orientation FO2 of the bottom members 112, the amount of thermal expansion of the bottom members 112 of the lower temperature in the longitudinal direction Y is increased to be larger than the amount of thermal expansion in the longitudinal direction Y of the bottom members 112 of which a fiber orientation is not regulated. As a result, as compared to the case where the ribs 110 and the bottom members 112 have the same coefficient of linear thermal expansion in the longitudinal direction Y, the difference in the amount of thermal expansion in the longitudinal direction Y between the ribs 110 and the bottom members 112 can be reduced. Therefore, the curvature deformation of the ribs 110 and the tilt of the light source 101 can be suppressed.

In the embodiment, the fiber orientation FO1 of the ribs 110 is orthogonal to the fiber orientation FO2 of the bottom members 112, but the present invention is not limited thereto. For suppressing the curvature deformation of the ribs 110 caused by thermal expansion, it is not necessary that the fiber orientation FO1 of the ribs 110 and the fiber orientation FO2 of the bottom members 112 are orthogonal to each other. For suppressing the curvature deformation of the ribs 110 caused by thermal expansion, it is only necessary that the mean coefficient of linear thermal expansion of the ribs 110 of the higher temperature in the direction along the longitudinal direction Y is smaller than the mean coefficient of linear thermal expansion of the bottom members 112 of the lower temperature in the direction along the longitudinal direction Y. In other words, it is only necessary that the fiber orientation FO1 of the ribs 110 and the fiber orientation FO2 of the bottom members 112 is regulated to be different from each other so that the mean coefficient of linear thermal expansion of the ribs 110 in the longitudinal direction Y may become smaller than the mean coefficient of linear thermal expansion in the longitudinal direction Y of the bottom members 112 which are provided on the sides opposite to the deflector 150 with respect to the ribs 110.

To facilitate the understanding of the above-mentioned effect of the fiber orientations of the rib 110 and the bottom member 112, a simple model is used to describe hereinafter the thermal deformation of the housing 105.

FIGS. 5A, 5B, and 5C are perspective diagrams of a simple housing model 405 illustrating fiber orientations. In FIGS. 5A, 5B, and 5C, the housing 105 is illustrated as the simple housing model 405 having a box shape. In FIGS. 5A, 5B, and 5C, the ribs 110 (110a, 110b) which contribute most to thermal deformation are simulated as ribs 410 (410a, 410b). Further, a front wall member 401 of the simple housing model 405 corresponds to the front wall member 120 of the housing 105 to which the light source 101 is fixed.

As illustrated in FIG. 1B and FIG. 4B, the rib 110 of the housing 105 is connected to a rib having a different angle. However, as illustrated in FIGS. 5A, 5B, and 5C, the rib 410 of the simple housing model 405 extends straight while crossing the simple housing model 405. The ribs 110 of the housing 105 and the ribs 410 of the simple housing model 405 have no essential difference in the manner of curvature deformation and in the cause of curvature deformation.

FIG. 5A illustrates Comparative Example 1. In Comparative Example 1, a fiber orientation F03 of the ribs 410 is aligned along the direction Z perpendicular to the longitudinal direction Y of the ribs 410. A fiber orientation FO2 of bottom members 412 (412a, 412b) is aligned along the direction X perpendicular to the longitudinal direction Y of the ribs 410. That is, the fiber orientation F03 of the ribs 410 and the fiber orientation FO2 of the bottom members 412 are aligned along the directions Z and X perpendicular to the longitudinal direction Y of the ribs 410, respectively. Accordingly, a direction in which a mean coefficient of linear thermal expansion of the ribs 410 is the largest and a direction in which a mean coefficient of linear thermal expansion of the bottom members 412 is the largest are both parallel to the longitudinal direction Y of the ribs 410. In other words, the mean coefficient of linear thermal expansion of the ribs 410 in the longitudinal direction Y is equal to the mean coefficient of linear thermal expansion of the bottom members 412 in the longitudinal direction Y.

FIG. 5B illustrates Comparative Example 2. In Comparative Example 2, a fiber orientation FO1 of the ribs 410 and a fiber orientation F04 of the bottom members 412 are both aligned along the longitudinal direction Y of the ribs 410. Accordingly, a direction in which a mean coefficient of linear thermal expansion of the rib 410 is the smallest and a direction in which a mean coefficient of linear thermal expansion of the bottom member 412 is the smallest are both parallel to the longitudinal direction Y of the ribs 410. In other words, the mean coefficient of linear thermal expansion of the ribs 410 in the longitudinal direction Y is equal to the mean coefficient of linear thermal expansion of the bottom members 412 in the longitudinal direction Y.

FIG. 5C illustrates the embodiment. In the embodiment, the fiber orientation FO1 of the ribs 410 are aligned along the longitudinal direction Y, and the fiber orientation FO2 of the bottom members 412 are aligned along the direction X perpendicular to the longitudinal direction Y. Accordingly, the direction in which the coefficient of linear thermal expansion of the ribs 410 is the smallest and the direction in which the mean coefficient of linear thermal expansion of the bottom member 412 is the largest are both parallel to the longitudinal direction Y of the ribs 410. In other words, the mean coefficient of linear thermal expansion of the ribs 410 in the longitudinal direction Y is different from the mean coefficient of linear thermal expansion of the bottom member 412 in the longitudinal direction Y. Specifically, the mean coefficient of linear thermal expansion of the ribs 410 in the longitudinal direction Y is smaller than the mean coefficient of linear thermal expansion of the bottom members 412 in the longitudinal direction Y.

FIGS. 6A, 6B, 6C, 6D, 6E, and 6F are diagrams illustrating the thermally-deformed simple housing model 405. FIGS. 6A to 6F illustrate calculation results of thermal deformation of the simple housing model 405 which are obtained under the condition that the temperature of the ribs 410 become higher than the temperature of the bottom members 412 because of heat transfer from the motor 108 and the integrated circuit of the drive board 109 to the simple housing model 405.

Figure 6A:
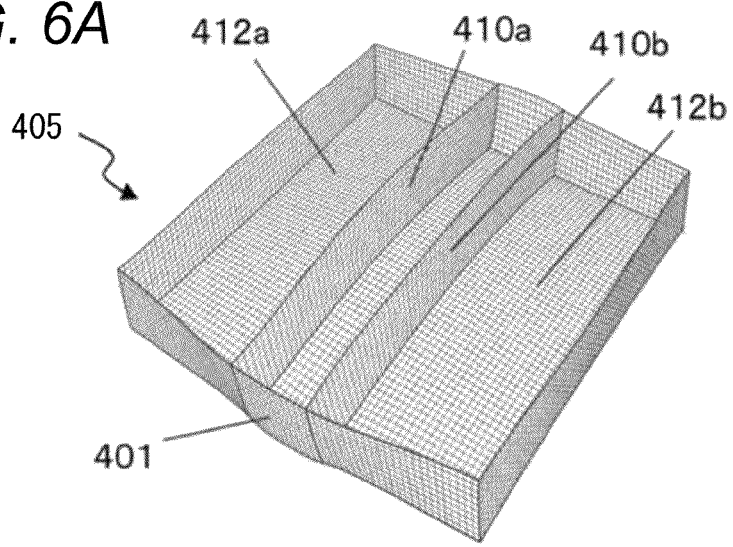
FIGS. 6A, 6B, 6C, 6D, 6E, and 6F are diagrams illustrating a thermally-deformed simple housing model.

FIG. 6A is a perspective diagram illustrating the calculation result of the thermal deformation of the simple housing model 405 according to Comparative Example 1 illustrated in FIG. 5A. FIG. 6D is a diagram illustrating the calculation result of the thermal deformation of the simple housing model 405 according to Comparative Example 1 as viewed from the side (in a direction indicated by the arrow A in FIG. 5A).

Figure 6B:
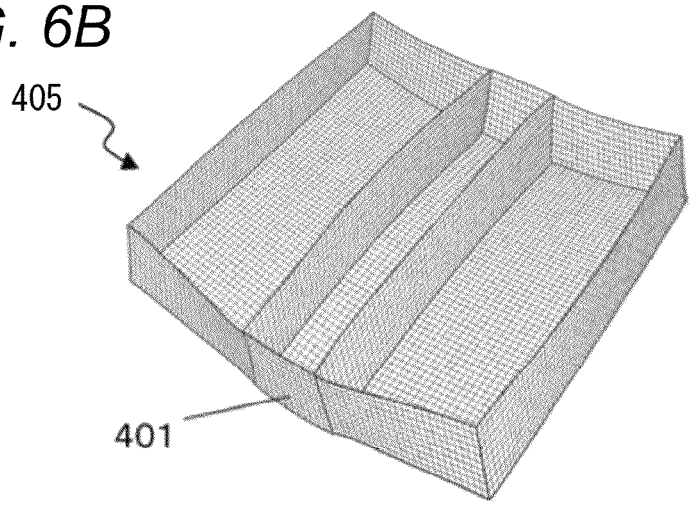

FIG. 6B is a perspective diagram illustrating the calculation result of the thermal deformation of the simple housing model 405 according to Comparative Example 2 illustrated in FIG. 5B. FIG. 6E is a diagram illustrating the calculation result of the thermal deformation of the simple housing model 405 according to Comparative Example 2 as viewed from the side (in a direction indicated by the arrow A in FIG. 5B).

Figure 6C:
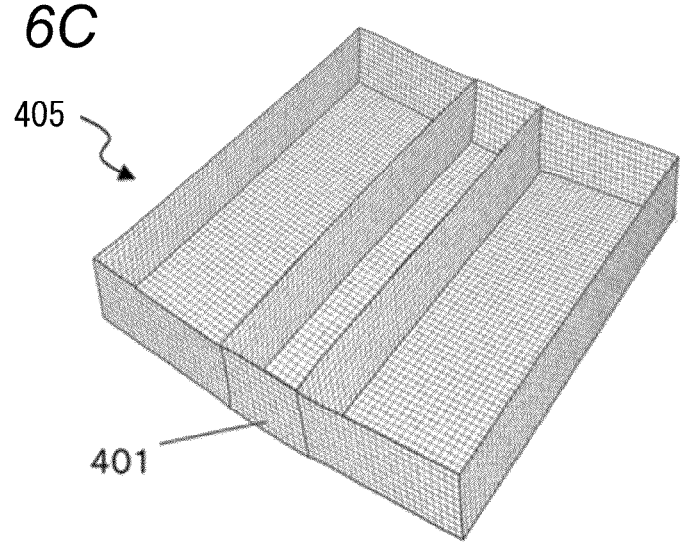
Figure 6D:
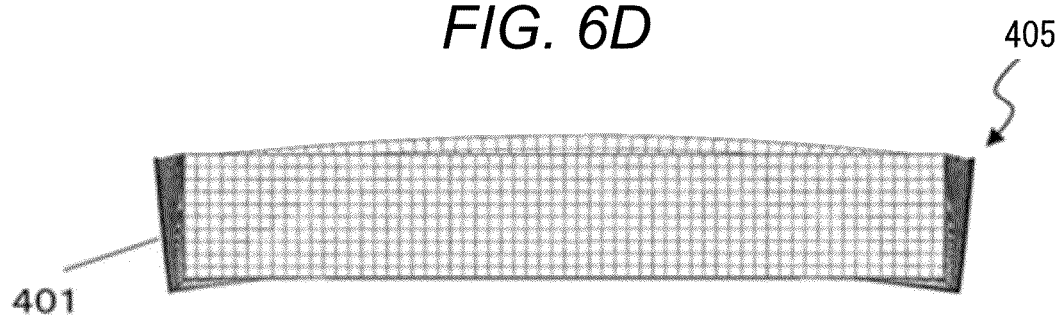
Figure 6E:
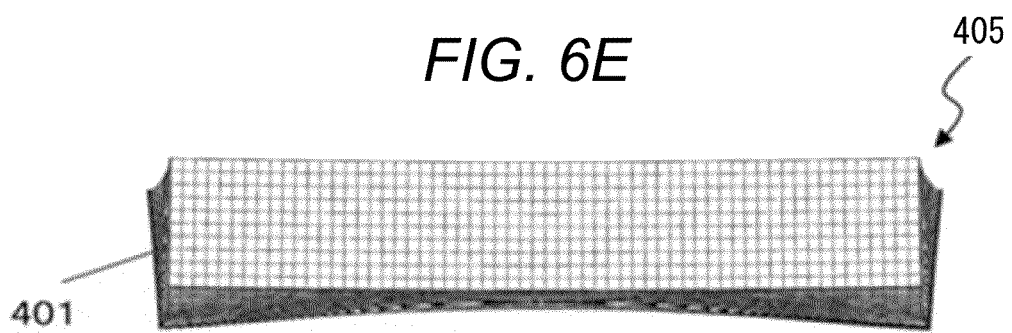
Figure 6F:
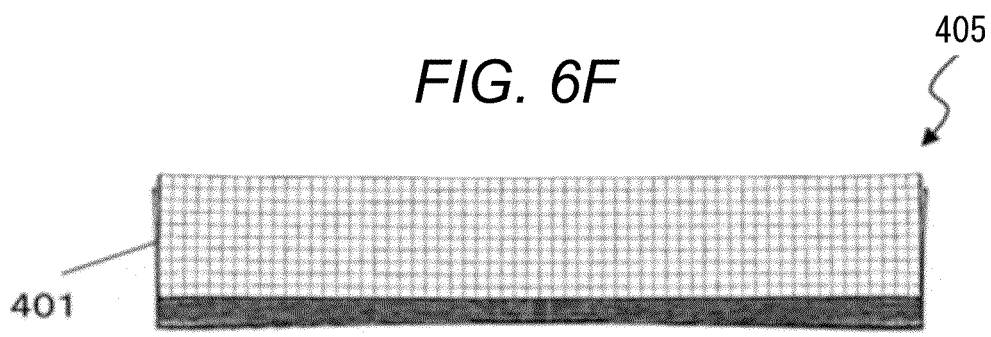

FIG. 6C is a perspective diagram illustrating the calculation result of the thermal deformation of the simple housing model 405 according to the embodiment illustrated in FIG. 5C. FIG. 6F is a diagram illustrating the calculation result of the thermal deformation of the simple housing model 405 according to the embodiment as viewed from the side (in a direction indicated by the arrow A in FIG. 5C).

It is found from FIGS. 6A, 6B, 6D, and 6E that, in the respective simple housing models 405, the ribs 410 undergoes the upwardly protruding convex curvature deformation, and as a result, the front wall member 401 is tilted so that the upper portion of the front wall member 401 to which the light source 101 is fixed is widened outward. However, as compared to the models of Comparative Example 1 (FIG. 6D) and Comparative Example 2 (FIG. 6E) in which the orientation directions of the reinforcement fibers 301 in the ribs 410 and the bottom members 412 are aligned in one direction, the amount of tilt of the front wall member 401 in the model of the embodiment (FIG. 6F) which defines the different fiber orientations is smaller.

Figure 7:
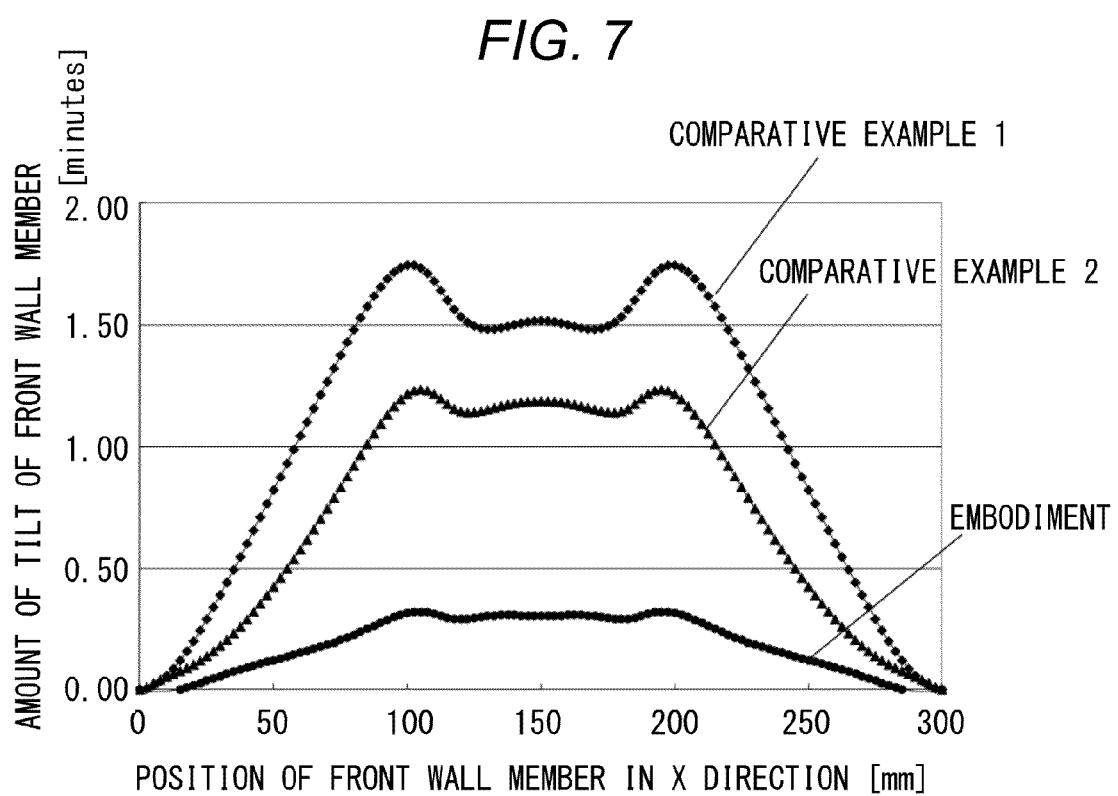
FIG. 7 is a graph showing the tilt of a front wall member to which a light source is fixed.

FIG. 7 is a graph showing the tilt of the front wall member 401 to which the light source 101 is fixed. In FIG. 7, the horizontal axis represents the position of the front wall member 401 in the X direction, and the vertical axis represents the amount of tilt of the front wall member 401 with respect to the axis in the X direction.

It is found from FIG. 7 that the amount of tilt of the front wall member 401 in the embodiment is smaller than the amounts of tilt of the front wall member 401 in Comparative Examples 1 and 2.

In the embodiment, the fiber orientation FO1 of the ribs 110 is different from the fiber orientation FO2 of the bottom members 112 provided on the side opposite to the deflector 150 with respect to the ribs 110. As a result, the mean coefficient of linear thermal expansion in the longitudinal direction Y of the ribs 110 is smaller than the mean coefficient of linear thermal expansion in the longitudinal direction Y of the bottom members 112 provided on the side opposite to the deflector 150 with respect to the ribs 110. Therefore, the difference in the amount of thermal expansion in the longitudinal direction Y between the ribs 110 and the bottom members 112 can be reduced, thereby reducing distortion of the housing 105. Thus, the tilt of the light source 101 fixed to the front wall member 120 of the housing 105 caused by thermal deformation can be reduced, thereby reducing the deviation of the scanning position of the light beam L emitted from the light source 101.

According to the embodiment, by regulating the fiber orientations of the reinforcement fibers included in the housing 105, the upwardly protruding convex curvature deformation caused by thermal deformation of the ribs 110 disposed in the vicinity of the heat generating source can be suppressed. Thus, the deviation of the scanning position of the light beam L emitted from the light source 101 can be reduced.

In the embodiment, it is only necessary that the direction of the fiber orientation FO1 of the ribs 110 and the direction of the fiber orientation FO2 of the bottom members 112 is orthogonal to each other rather than in parallel.

According to the embodiment, the fiber orientation FO1 of the ribs 110 and the fiber orientation FO2 of the bottom members 112 are regulated to be different from each other so as to reduce the difference in the amount of thermal expansion between the ribs 110 of the higher temperature and the bottom members 112 of the lower temperature. However, the fiber orientation of the bottom member 111 interposed between the rib 110a and the rib 110b may be regulated, as a result of that, the distortion of the housing 105 can be further reduced.

The main heat generating sources in the light scanning apparatus 100 are provided on the bottom member 111, and hence the temperature of the bottom member 111 is higher than the temperature of the bottom members 112. Therefore, the amount of thermal expansion of the bottom member 111 is larger than the amount of thermal expansion of the bottom members 112. In view of this, the mean coefficient of linear thermal expansion of the ribs 110 in the direction along the longitudinal direction Y is decreased and the mean coefficient of linear thermal expansion of the bottom member 111 in the direction along the longitudinal direction Y may be also decreased. Thus, the amount of thermal expansion of the ribs 110 can be further reduced, thereby further reducing the distortion of the housing 105.

Specifically, for example, by aligning the fiber orientation of the bottom member 111 along the same longitudinal direction Y as with the fiber orientation of the rib 110, the difference in the amount of thermal expansion between the bottom member 111 and the bottom members 112 can be reduced. Also in this case, as described above, the fibers of the bottom member 111 may not be oriented in the longitudinal direction of the ribs 110. The effect of the embodiment can be obtained as long as the fiber orientation of the bottom member 111 is regulated so that the mean coefficient of linear thermal expansion of the bottom member 111 in the longitudinal direction Y may be smaller than the mean coefficient of linear thermal expansion of the bottom members 112 in the longitudinal direction Y.

Further, the temperatures of the side wall members 122 and 123 are lower than the temperature of the ribs 110. In view of this, the fiber orientation of the ribs 110 are regulated to be different from the fiber orientations of the side wall members 122 and 123 so that the mean coefficient of linear thermal expansion of the ribs 110 in the longitudinal direction Y may be smaller than the mean coefficients of linear thermal expansion of the side wall members 122 and 123 of the housing 105. In this manner, the distortion of the housing 105 can be reduced.

Next, a resin molding method of regulating the fiber orientations of the ribs 110 and the bottom members 112 according to the embodiment will be described.

The fiber orientation of the reinforcement fibers 301 is determined by the direction of shearing force generated inside the flowing resin 302. The fiber orientation of the reinforcement fibers 301 is the same as the flowing direction of the resin 302. Therefore, the positions of an inflow gate and an outflow gate for the resin 302 in a mold (not shown) are set so that the resin 302 flows in directions in which the reinforcement fibers 301 is intended to be oriented.

Figure 8A:
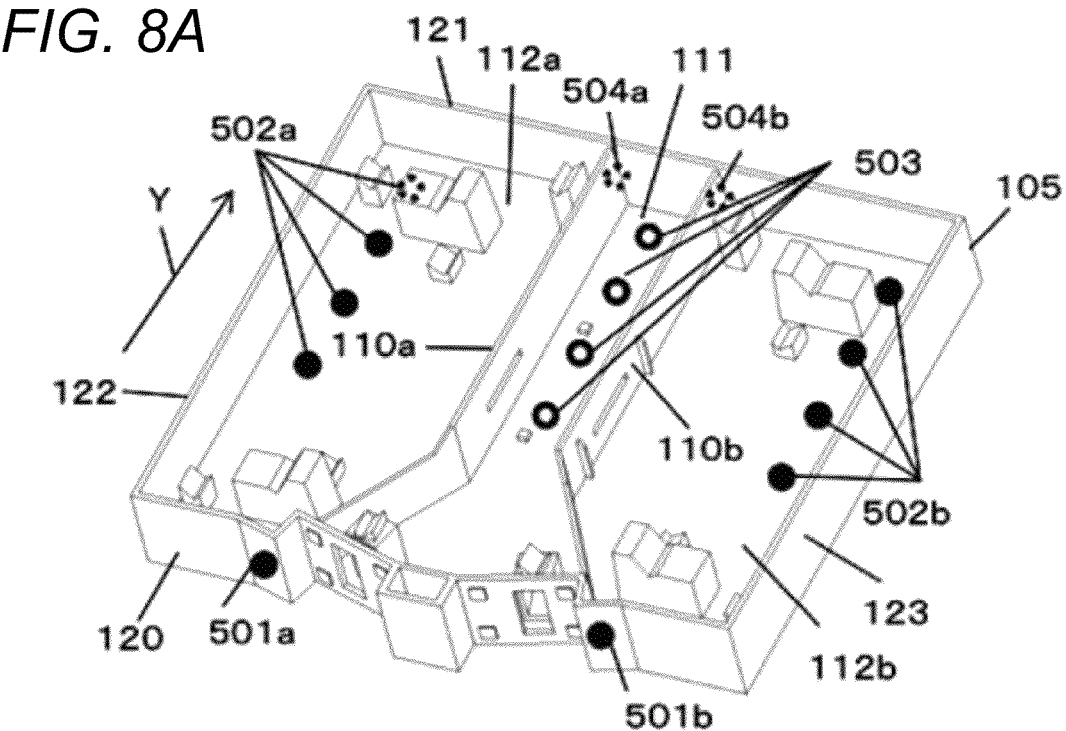
FIGS. 8A, 8B, and 8C are diagrams illustrating inflow and outflow gates and the flow of a resin according to the embodiment.
Figure 8C:
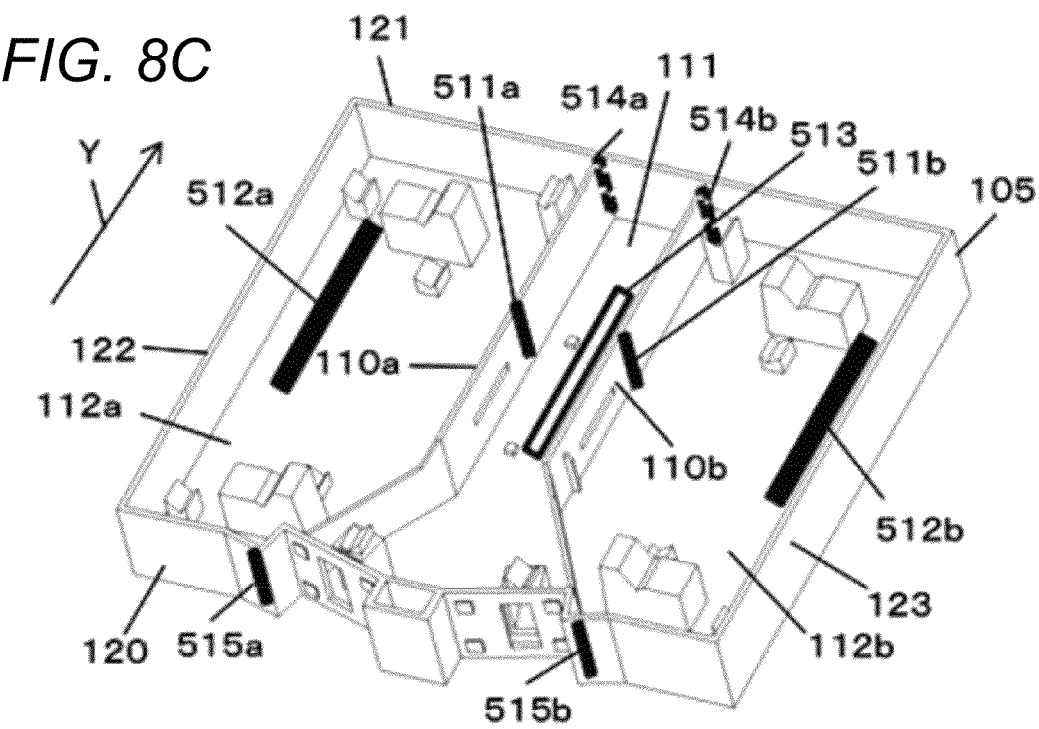
Figure 8B:
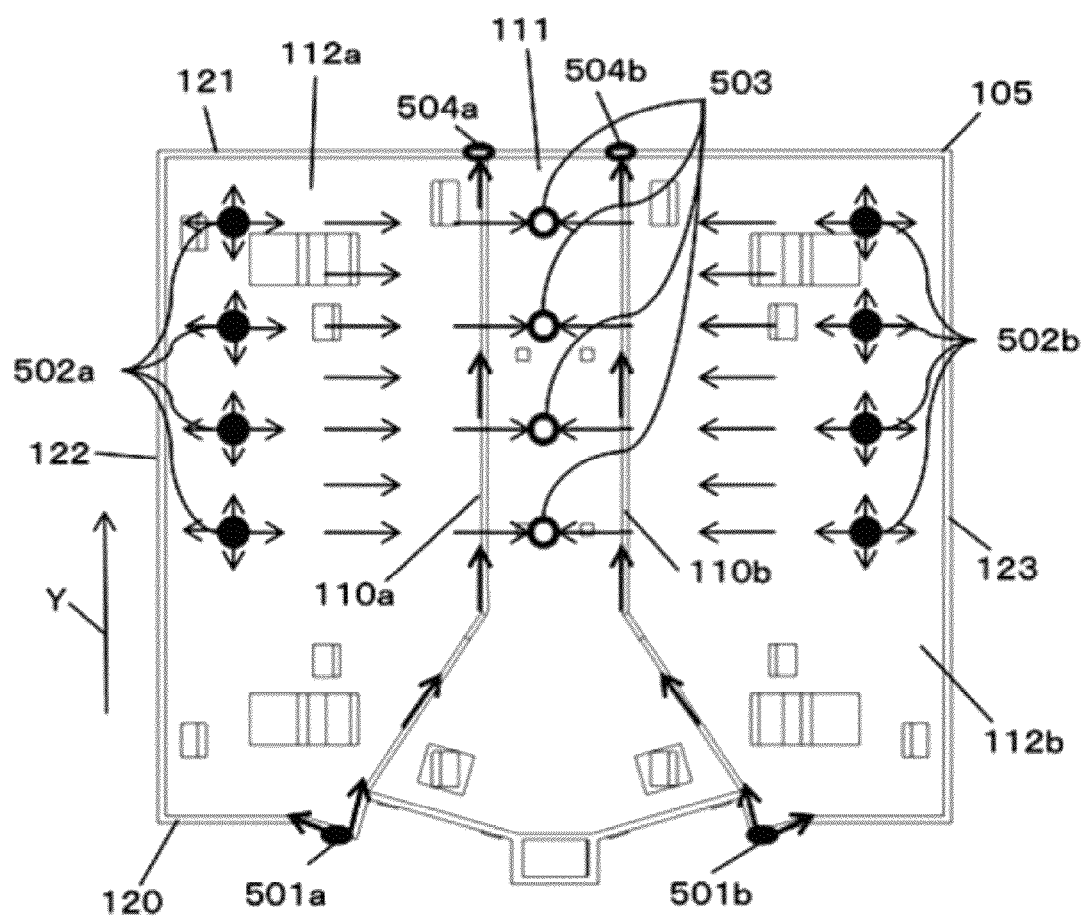

FIGS. 8A, 8B, and 8C are diagrams illustrating inflow gates 501 (501a, 501b) and 502 (502a, 502b) and outflow gates 503 and 504 (504a, 504b) and illustrating the flow of the fiber-reinforced resin according to the embodiment. The inflow gates 501 and 502 are an entrance configured to pour a resin into a mold (not shown). The outflow gates 503 and 504 are an exit configured to drain a resin from the mold (not shown). In the embodiment, the ribs 110 and the bottom members 112 have different fiber orientations, and hence different inflow and outflow gates are provided for the ribs 110 and the bottom members 112, respectively.

FIG. 8A is a perspective diagram of the housing 105, illustrating an example of the inflow gates 501 and 502 and the outflow gates 503 and 504.

The circular inflow gates 501 (501a, 501b) are provided in the front wall member 120 of the housing 105. The inflow gate 501a is provided in the front wall member 120 at a connection portion of the rib 110a and the front wall member 120 or in the vicinity of the connection portion. The inflow gate 501b is provided in the front wall member 120 at a connection portion of the rib 110b and the front wall member 120 or in the vicinity of the connection portion. The circular outflow gates 504 (504a, 504b) are provided in the rear wall member 121 of the housing 105. The outflow gate 504a is provided in the rear wall member 121 at a connection portion of the rib 110a and the rear wall member 121 or in the vicinity of the connection portion. The outflow gate 504b is provided in the rear wall member 121 at a connection portion of the rib 110b and the rear wall member 121 or in the vicinity of the connection portion.

As illustrated in FIG. 8A, the inflow gates 501 and the outflow gates 504 are disposed so that the fiber-reinforced resin flows through the ribs 110 along the longitudinal direction Y of the ribs 110.

The circular inflow gate 502 (502a, 502b) is provided in the bottom member 112 of the housing 105. A plurality of (four in the embodiment) inflow gates 502a are provided in the bottom member 112a in the vicinity of the side wall member 122 of the housing 105 and side by side in line along the longitudinal direction Y. A plurality of (four in the embodiment) inflow gates 502b are provided in the bottom member 112b in the vicinity of the side wall member 123 of the housing 105 and side by side in line along the longitudinal direction Y. A plurality of (four in the embodiment) circular outflow gates 503 are provided in the bottom member 111 between the rib 110a and the rib 110b and side by side in line along the longitudinal direction Y. In this case, the plurality of inflow gates 502 and the plurality of outflow gates 503 are provided side by side in line in order to create a uniform flow of the fiber-reinforced resin in the direction perpendicular to the longitudinal direction Y.

As illustrated in FIG. 8A, the inflow gates 502 and the outflow gates 503 are disposed so that the fiber-reinforced resins flows through the bottom members 112 and 111 along the direction perpendicular to the longitudinal direction Y of the ribs 110.

FIG. 8B is a plan view of the housing 105, illustrating the flows of the fiber-reinforced resin.

Parts of the fiber-reinforced resin from the inflow gates 501 flow to the rib 110 and the front wall member 120. Parts of the fiber-reinforced resin flowing thorough the ribs 110 flow to the outflow gates 504. In this manner, the fiber orientation of the ribs 110 is aligned along the longitudinal direction Y.

Parts of the fiber-reinforced resin from the inflow gates 502 flow to the bottom members 112. Parts of the fiber-reinforced resin flowing to the bottom members 112 pass under the ribs 110 to flow to the outflow gates 503 provided in the bottom member 111. In this manner, the fiber orientation of the bottom members 112 is aligned along the direction perpendicular to the longitudinal direction Y.

Therefore, the fiber orientation of the ribs 110 and the fiber orientation of the bottom members 112 are different from each other.

Note that, similar fiber orientations can be obtained even when the flow direction of the fiber-reinforced resin from the inflow gates 501 to the outflow gates 504 is reversed or the flow direction of the fiber-reinforced resin from the inflow gates 502 to the outflow gates 503 are reversed.

FIG. 8C is a perspective view of the housing 105, illustrating another example of inflow gates 511 and 512 and outflow gates 513, 514, and 515.

The rectangular inflow gates 511 (511a, 511b) are provided at the centers of the ribs 110 (110a, 110b), respectively. The outflow gates 514 and 515 are provided in the rear wall member 121 and the front wall member 120 of the housing 105, respectively. The rectangular outflow gates 514 (514a, 514b) are provided in the rear wall member 121 of the housing 105. The outflow gate 514a is provided in the rear wall member 121 at a connection portion of the rib 110a and the rear wall member 121 or in the vicinity of the connection portion. The outflow gate 514b is provided in the rear wall member 121 at a connection portion of the rib 110b and the rear wall member 121 or in the vicinity of the connection portion. The rectangular outflow gates 515 (515a, 515b) are provided in the front wall member 120 of the housing 105. The outflow gate 515a is provided in the front wall member 120 at a connection portion of the rib 110a and the front wall member 120 or in the vicinity of the connection portion. The outflow gate 515b is provided in the front wall member 120 at a connection portion of the rib 110b and the front wall member 120 or in the vicinity of the connection portion.

As illustrated in FIG. 8C, the inflow gates 511 and the outflow gates 514 and 515 are disposed so that the fiber-reinforced resin flows through the ribs 110 along the longitudinal direction Y of the ribs 110.

The rectangular inflow gates 512 (512a, 512b) are provided in the bottom members 112 of the housing 105. The rectangular inflow gate 512a is provided in the bottom member 112a in the vicinity of the side wall member 122 of the housing 105, and extends along the longitudinal direction Y. The rectangular inflow gate 512b is provided in the bottom member 112b in the vicinity of the side wall member 123 of the housing 105, and extends along the longitudinal direction Y. The rectangular outflow gate 513 is provided in the bottom member 111 between the rib 110a and the rib 110b, and extends along the longitudinal direction Y. The rectangular inflow gates 512 and the rectangular outflow gate 513 extending in the longitudinal direction Y are provided in order to create a uniform flow of the fiber-reinforced resin in the direction perpendicular to the longitudinal direction Y.

As illustrated in FIG. 8C, the inflow gate 512 and the outflow gate 513 are disposed so that the fiber-reinforced resin flows through the bottom members 112 and 111 along the direction perpendicular to the longitudinal direction Y of the rib 110.

Parts of the fiber-reinforced resin from the inflow gates 511 flow to the outflow gates 514 through the ribs 110. Parts of the fiber-reinforced resin from the inflow gates 511 flow to the outflow gates 515 through the ribs 110. In this manner, the fiber orientation of the ribs 110 is aligned along the longitudinal direction Y.

Parts of the fiber-reinforced resin from the inflow gates 512 flow to the bottom members 112. Parts of the fiber-reinforced resin flowing to the bottom members 112 pass under the ribs 110 to flow to the outflow gate 513 provided in the bottom member 111. In this manner, the fiber orientation of the bottom member 112 is aligned along the direction perpendicular to the longitudinal direction Y.

Therefore, the fiber orientation of the ribs 110 and the fiber orientation of the bottom members 112 are different from each other.

Note that, similar fiber orientations can be obtained even when the flow direction of the fiber-reinforced resin from the inflow gates 511 to the outflow gates 514 and 515 is reversed or the flow direction of the fiber-reinforced resin from the inflow gates 512 and the outflow gate 513 is reversed.

Further, as a resin molding method of realizing the fiber orientations as described in the embodiment, the two-color molding may be used to create different fiber orientations at respective regions.

According to the embodiment, the fiber orientations of the rib and the bottom member of the housing are regulated, and hence the difference in deformation amount between the rib and the bottom member, which is caused by a temperature difference between the rib and the bottom member, can be reduced, to thereby reduce a distortion of the housing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-258642, filed Nov. 28, 2011, which is hereby incorporated by reference herein in its entirety.

What is claimed is:

1. A light scanning apparatus configured to irradiate a surface to be scanned with a light beam, the light scanning apparatus comprising:
    a light source configured to emit the light beam;
    a deflector configured to deflect the light beam emitted from the light source so that the light beam scans the surface to be scanned;
    an optical element configured to lead the light beam deflected by the deflector to the surface to be scanned;
    a housing configured to hold the light source, the deflector, and the optical element, the housing including fibers; and
    a rib formed integrally with a bottom portion of the housing on which the deflector and the optical element are disposed, the rib being provided to stand on the bottom portion between the deflector and the optical element in order to suppress a deformation of the housing in a scanning direction in which the light beam scans the surface to be scanned,
    wherein the fibers of the rib are oriented along the scanning direction, and the fibers of the bottom portion are oriented along the bottom portion and in a direction perpendicular to the scanning direction.

2. A light scanning apparatus according to claim 1, wherein a mean coefficient of linear thermal expansion of the rib in the scanning direction is smaller than a mean coefficient of linear thermal expansion of the bottom portion in the scanning direction.

3. A light scanning apparatus according to claim 1, wherein the rib comprises two ribs between which the deflector is interposed.

4. A light scanning apparatus according to claim 3, wherein the fibers of the bottom portion between the two ribs are oriented along the scanning direction.

5. A light scanning apparatus according to claim 1, wherein the housing is formed into a box shape.

6. A light scanning apparatus according to claim 5, wherein the fibers of a side wall member of the housing having the box shape is oriented along the side wall member and in a direction perpendicular to the scanning direction.

7. An image forming apparatus, comprising:
    an image forming portion; and
    a light scanning apparatus according to claim 1, configured to irradiate a surface to be scanned by the image forming portion with a light beam.

* * * * *